US008364788B2

(12) United States Patent
Lomelli et al.

(10) Patent No.: US 8,364,788 B2
(45) Date of Patent: Jan. 29, 2013

(54) PROCESSING CLIENT REQUESTS FOR COMMON SERVICES ACCORDING TO ONE OR MORE CANONICAL FORMS

(75) Inventors: Ivan Lomelli, Boynton Beach, FL (US); Sanjay P. Lobo, Allen, TX (US); Steven D. Witkop, Clinton Township, MI (US); Alexander Orlov, Caringbah (AU)

(73) Assignee: Hewlett-Packard Development Company, L.P., Houston, TX (US)

( * ) Notice: Subject to any disclaimer, the term of this patent is extended or adjusted under 35 U.S.C. 154(b) by 583 days.

(21) Appl. No.: 12/047,855

(22) Filed: Mar. 13, 2008

(65) Prior Publication Data

US 2009/0234903 A1 Sep. 17, 2009

(51) Int. Cl.
*G06F 15/177* (2006.01)
(52) U.S. Cl. ...................................... 709/220
(58) Field of Classification Search .................. 709/220
See application file for complete search history.

(56) References Cited

U.S. PATENT DOCUMENTS

| | | | | |
|---|---|---|---|---|
| 5,778,189 | A * | 7/1998 | Kimura et al. | 709/236 |
| 6,594,700 | B1 * | 7/2003 | Graham et al. | 709/230 |
| 7,340,714 | B2 * | 3/2008 | Upton | 717/102 |
| 7,430,757 | B1 * | 9/2008 | Chari et al. | 726/4 |
| 7,516,176 | B2 * | 4/2009 | Potter et al. | 709/201 |
| 7,516,440 | B2 * | 4/2009 | Upton | 717/106 |
| 2002/0002577 | A1 | 1/2002 | Garg et al. | 709/104 |
| 2003/0135509 | A1 * | 7/2003 | Davis et al. | 707/100 |
| 2003/0135628 | A1 | 7/2003 | Fletcher et al. | 709/229 |
| 2003/0154239 | A1 * | 8/2003 | Davis et al. | 709/201 |
| 2005/0220139 | A1 * | 10/2005 | Aholainen | 370/466 |
| 2006/0119881 | A1 * | 6/2006 | Zarco | 358/1.15 |
| 2006/0288228 | A1 | 12/2006 | Botz et al. | 713/182 |
| 2007/0038994 | A1 * | 2/2007 | Davis et al. | 717/174 |
| 2007/0061396 | A1 * | 3/2007 | Morris | 709/203 |
| 2009/0049200 | A1 * | 2/2009 | Lin et al. | 709/246 |

* cited by examiner

*Primary Examiner* — Larry Donaghue

(57) ABSTRACT

In certain embodiments, a method for processing client requests for common services according to one or more canonical forms includes receiving from a computer system associated with a particular client a request to provide a common service and converting at least a portion of the request according to a canonical form. The method further includes accessing configuration data for the particular client specifying one or more processes for providing the common service to the particular client, and executing, based on the configuration data for the particular client, the one or more processes to communicate with a vendor-specific solution for providing the common service. At least a portion of a response from the vendor-specific solution is converted into the canonical form. Based on the configuration data for the particular client and the response from the vendor-specific solution, an output for providing the common service to the particular client is determined. The output is transmitted to the computer system associated with the particular client.

20 Claims, 6 Drawing Sheets

| SERVICE NAME | INTERFACES |
|---|---|
| AUTHENTICATION | AUTHENTICATE |
|  | LOG OFF |
| ADMINISTRATION | GetUser |
|  | ChangeUser |
|  | ChangePassword |
|  | ResetPassword |
|  | GetAvailableRoles |
|  | AddRoles |
|  | RemoveRoles |
| AUTHORIZATION | GetClientList |
|  | GetRoles |
|  | IsAuthorized |
| PROVISIONING | CreateUser |
|  | GetAvailableUserAttributes |
|  | SuspendUser |

*FIG. 3*

PROCESSING CLIENT REQUESTS FOR COMMON SERVICES ACCORDING TO ONE OR MORE CANONICAL FORMS

TECHNICAL FIELD

The present invention relates generally to processing client requests, and more particularly to processing client requests for common services according to one or more canonical forms.

BACKGROUND

Client companies often contract with a service provider or other entity for the service provider to provide one or more services to the client company. These services may include software application development and other suitable information technology services. Traditionally, software application developers have addressed client needs by implementing unique solutions for different clients, even where such client needs call for certain common services across multiple clients (or across multiple divisions within a single client). For example, software application developers typically create vendor-specific and/or platform-specific solutions for each client. Often, interfaces between the computer system and vendor-specific and platform-specific solutions are hard-coded and difficult to modify once implemented. Furthermore, developing vendor-specific and platform-specific solutions for each client may be time consuming and usually results in greater costs to the client.

SUMMARY

According to certain embodiments of the present invention, disadvantages and problems associated with previous techniques for implementing client solutions may be reduced or eliminated.

In certain embodiments, a method for processing client requests for common services according to one or more canonical forms includes receiving from a computer system associated with a particular client a request to provide a common service and converting at least a portion of the request according to a canonical form. The method further includes accessing configuration data for the particular client specifying one or more processes for providing the common service to the particular client, and executing, based on the configuration data for the particular client, the one or more processes to communicate with a vendor-specific solution for providing the common service. At least a portion of a response from the vendor-specific solution is converted into the canonical form. Based on the configuration data for the particular client and the response from the vendor-specific solution, an output for providing the common service to the particular client is determined. The output is transmitted to the computer system associated with the particular client.

Particular embodiments of the present invention may provide one or more technical advantages. In certain embodiments, the present invention provides a reusable and configurable multi-tenant run-time environment for client applications to perform one or more common functions. For example, a single instance of the common services module may be able to support multiple client companies while maintaining the integrity and confidentiality of the data for each client. In certain embodiments, the present invention provides an extensible and configurable system. For example, the present invention may be configurable according to client-specific configurations and extensible to handle different and/or new vendor-specific solutions.

In certain embodiments, the present invention provides a consistent interface for application developers to use to provide the common service, regardless of the vendor-specific solution actually used to implement the service, which may speed up the application development process. This may decrease the time for application developers to develop applications for clients and may lead to faster time-to-market and/or faster time-to-revenue. In certain embodiments, the present invention may enhance a service provider's Service Oriented Architecture (SOA) capabilities. In certain embodiments, the present invention is adapted to more easily handle application changes (e.g., changes to a vendor-specific solution or platform) for clients than previous solutions, which typically required application developers to modify application source code to conform to the changes. This may reduce or eliminate the cost of incorporating client changes.

Certain embodiments of the present invention may provide common security services (e.g., as a security common services stack). Such embodiments may provide better control of the development and change process of Identity and Access Management logic improves the overall application security posture. In certain embodiments, application developers are relieved of the burden of developing logic specific to Identity and Access Management. As the security common services stack was architected as loosely coupled components connected through open standards (e.g., web services), there is flexibility on deployment to address scalability needs. Certain embodiments reduce security vulnerabilities, which may reduce maintenance costs and increase a provider's reputation on protecting a client's information assets. In a security context with previous and existing solutions, modifications to application source code in response to a vendor or platform change often cause unforeseen vulnerabilities to appear in the system. Certain embodiments of the present invention reduce or eliminate such unforeseen vulnerabilities.

In certain embodiments, when a client leverages the common services module, behavior for each of the canonical interfaces may be configured and verified by an administrator. For example, when a client leverages the security common services stack, behavior for each canonical interface may be configured and verified by a security administrator. An application development team may be assembled to develop reusable orchestration processes and leverage existing adapters in order to enhance the behavior of the canonical interfaces to meet common organization or enterprise-wide requirements associated with the common services provided. For example, an application development team may be assembled to develop reusable orchestration processes and leverage existing adapters in order to enhance the behavior of the canonical interfaces to meet common organizational or enterprise-wide security requirements (e.g., regulatory compliance and/or security policies).

In certain embodiments, during an application development process, developers can be concerned with the inner-working details of the common services provided (e.g., authentication, authorization, administration, and provisioning services). Instead, the developers may invoke the relevant canonical interfaces from an already-configured common services module (e.g., security common services stack) and take appropriate action on the returned information.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which:

FIG. 3 illustrates a table of example common services in a security services implementation, along with example canonical interfaces that may correspond to those example common services;

DESCRIPTION OF EXAMPLE EMBODIMENTS

Figure 1:
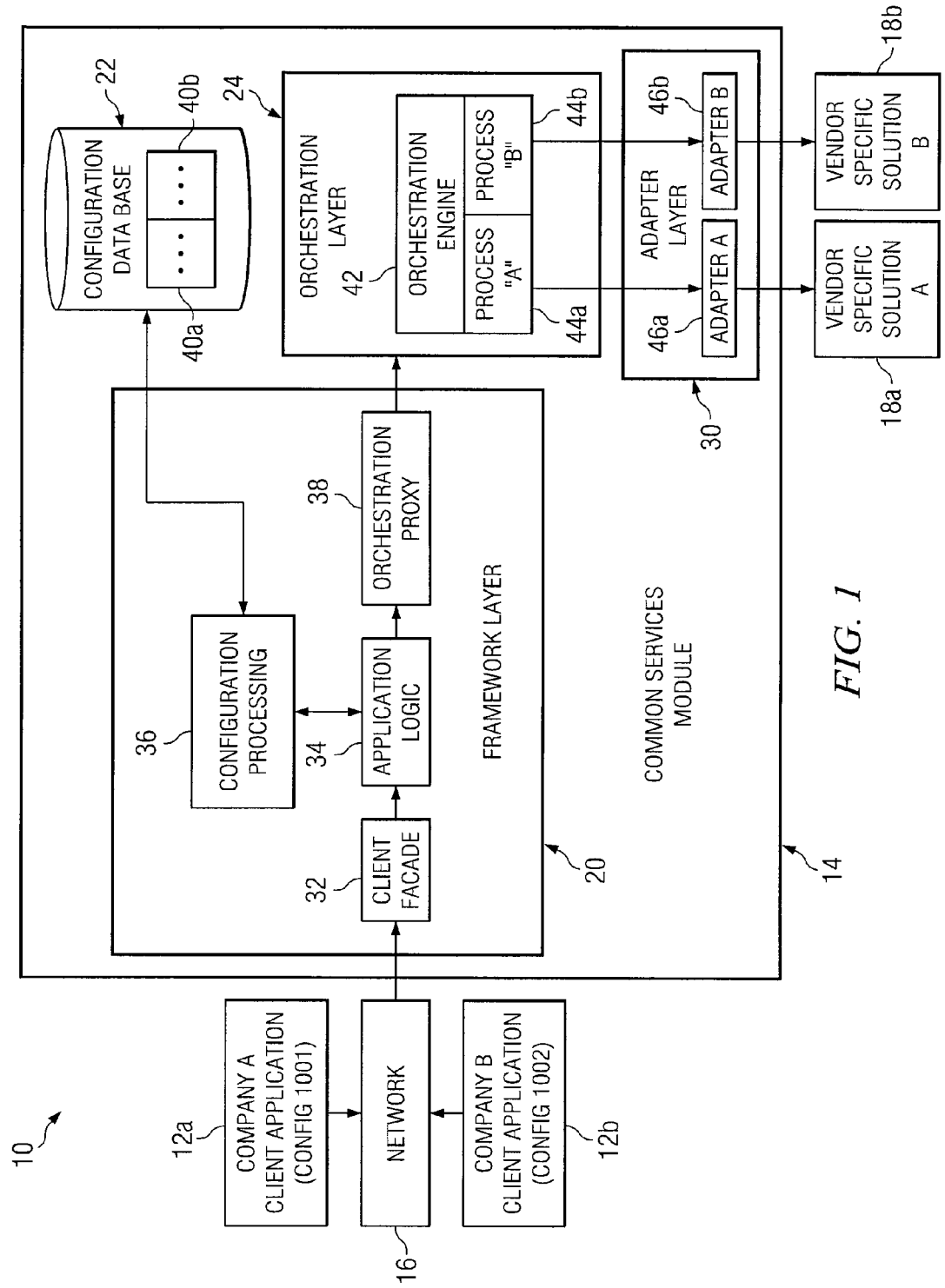
FIG. 1 illustrates an example system for processing client requests for common services according to one or more canonical forms.

FIG. 1 illustrates an example system 10 for processing client requests for common services according to one or more canonical forms. In the illustrated example, system 10 includes one or more computer systems 12, a common services module 14, a network 16, and one or more vendor-specific solutions 18. Although this particular implementation of system 10 is illustrated and primarily described, the present invention contemplates any suitable implementation of system 10 according to particular needs.

In general, common services module 14 provides one or more common services to one or more client companies associated with computer systems 12 according to one or more canonical forms. In certain embodiments, common services module 14 is operable to receive from a computer system 12 associated with a particular client a request to provide a common service, and to convert at least a portion of the request according to a canonical form. Common services module 14 is operable to access configuration data for the particular client, the configuration data for the particular client specifying one or more processes for providing the common service to the particular client. Common services module 14 is operable to execute, based on the configuration data for the particular client, the one or more processes to communicate with a vendor-specific solution 18 for providing the common service, and to convert at least a portion of a response from the vendor-specific solution 18 into the canonical form. Common services module 14 may determine, based on the configuration data for the particular client and the response from the vendor-specific solution 18, an output for providing the common service to the particular client, and to transmit the output to the computer system 12 associated with the particular client.

A common service may include one or more software application functions that may be provided to one or more organizations (e.g., internal or external clients) across one or more client applications. Example common services may include security functions such as authentication, administration, authorization, and provisioning services. Other example common services include system logging, document management, application monitoring, exception handling, messaging, or any other suitable services. As described above, client companies often contract with a service provider for the service provider to develop one or more software applications for the client company. A common service may be a discrete functional component of a larger application or may be the entire software application. For example, security common services may be a portion of a larger application provided by the service provider to a client.

A canonical form may include one or more normalized interfaces for providing the common services to a number of client companies. A canonical form abstracts particular functions and parameters to a common representation that can be used across a number of software applications. The canonical forms provide a layer of abstraction from the particular client applications of client systems 12 and the particular vendor-specific solutions 18. The abstracted layer provided by the canonical forms can be accessed by software application developers, so the software application developers may not need to know the way the underlying vendor-specific solution 18 actually implements the service. Each common service may support one or more canonical interfaces that are made available to application developers. For purposes of this description, the terms "canonical form" and "canonical interface" may be used interchangeably.

The particular common services selected at build time may represent appropriate abstractions from the functionality of various multiple vendor-specific solutions 18. For example, in one example security implementation, the common services for providing the security services may be authentication, administration, authorization, and provisioning. One or more canonical interfaces may be defined for each of these common services. The actual implementation for a particular client company may then be provided according to the client configurations (stored in a configuration database, described below) and the particular vendor-specific solution 18 used for the client.

Client companies (e.g., client company A and client company B) may include any suitable entities that contract with an external contractor (e.g., a service provider) to provide various software-related services to the client company. Client companies may be internal or external clients of the service provider. As an example, the software-related services may include application development and/or hosting, data storage, or any other suitable type of software-related service. In certain embodiments, the software-related services include security services, such as security authorization, administration, authentication, and provisioning. Other software-related services may include system logging, document management, application monitoring, exception handling, messaging, or any other suitable services. It should be noted that these software-related services are described merely by way of example, and those of ordinary skill in the art will understand that the present invention may be implemented with any suitable types of software-related services.

Computer systems 12 are associated with client companies. In the illustrated example, computer system 12a is associated with client company A, and computer system 12b is associated with client company B. Throughout the remainder of this description, the terms "computer system 12," "client company," and "client" may be used interchangeably.

Client applications running on computer systems 12 may submit requests to common services module 14. These requests may be for one or more common services provided by common services module 14. For example, in an embodiment in which common services module 14 provides security services, the request may be for one or more common services associated with security. Each request may include one or more parameters, a unique identifier of the client company from which the request was received, and any other suitable information, according to particular needs.

Computer systems 12 may be local to or remote from common services module 14. Although a particular number of computer systems 12 is illustrated and primarily described, the present invention contemplates system 10 including any suitable number of computer systems 12. For example, common services module 14 may be coupled to multiple distributed computer systems 12.

Computer systems 12 may be coupled to common services module 14 via one or more networks 16 (for simplicity, referred to hereinafter in the singular). Network 16 facilitates wireless or wireline communication. Network 16 may communicate, for example, IP packets, Frame Relay frames, Asynchronous Transfer Mode (ATM) cells, voice, video, data, and other suitable information between network addresses. Network 16 may include one or more local area networks (LANs), radio access networks (RANs), metropolitan area networks (MANs), wide area networks (WANs), all or a portion of the global computer network known as the Internet, and/or any other communication system or systems at one or more locations.

Common services module 14 is operable to provide common services to computer systems 12 by processing the requests from computer systems 12 according to one or more canonical forms. The use of canonical forms may allow the present invention to provide a reusable and configurable, multi-tenant run-time environment for client applications of computer systems 12 to perform one or more common functions. In certain embodiments, the service provider is responsible for building and/or maintaining common services module 14. Common services module 14 may be located at a site operated by the service provider, and may be available for use to a number of client companies. Alternatively, an instance of common services module 14 may be installed at a site associated with a particular client company. In certain embodiments, one deployment instance of common services module 14 is capable of supporting multiple client applications.

In general, common services module 14 is operable to receive a request from computer system 12, convert the request according to one or more canonical forms, process the request according to configuration information for the client company associated with the request, invoke a vendor-specific solutions 18 to perform the requested common service, receive a result from the vendor-specific product 18, convert the result into a format for the client associated with the request, and return the result to the requesting computer system 12.

In the illustrated example, common services module 14 includes a framework layer 20, a configuration database 22, an orchestration layer 24, and an adapter layer 30. Each of these components of common services module 14 is described in more detail below. Although common services module 14 is described as including particular components and those components are described as performing particular functions, the present invention contemplates common services module 14 comprising any suitable components, each operable to perform any of the functions of common services module 14. Additionally, although various components of common services module 14 are illustrated and described separately, the present invention contemplates combining these components (or further separating these components), if appropriate.

Framework layer 20 comprises client façade 32, application logic 34, configuration processing 36, and orchestration proxy 38. Each of these components of framework layer 20 is described in more detail below.

Client façade 32 exposes one or more canonical interfaces to computer systems 12 for providing the common services to computer systems 12. In certain embodiments, client façade 32 is implemented to support a web services protocol for communicating with computer systems 12. However, the present invention contemplates client façade 32 being implemented to handle any suitable protocol, as well as any suitable combination of protocols. As a particular example, another possible protocol is the JAVA MESSAGING SERVICE (JMS) by SUN MICROSYSTEMS, INC.

Client façade 32 may be operable to translate between protocols and/or message formats used by computer systems 12 and the protocol and/or message format used by common services module 14. In certain embodiments, client façade 32 is a thin layer that isolates web services-specific functionality from the rest of the components of common services module 14.

Client façade 32 may receive a request from a particular computer system 12 and convert at least a portion of the request according to a canonical form. For example, upon receiving the request from the particular computer system 12, client façade 32 may take the parameters included in the request from the particular computer system 12 and standardize those parameters according to the canonical form. Whether the parameters were submitted in a web services format, a JMS format, or another suitable format, client façade 32 may create a data structure that is independent (but may be the same) as the protocol used by the client. Client façade 32 may perform basic parameter validation of the parameters of requests received from computer systems 12. In certain embodiments, client façade 32 handles Simple Object Access Protocol (SOAP)-specific processing to gather the request information and present it to the other layers of common services module 14 in a normalized fashion (i.e., according to a canonical form). In certain embodiments, if the requirements change from the web services perspective (e.g., additional information in the SOAP header block), changes to common services module 14 to accommodate those changed requirements may be isolated to client façade 32.

In a particular example in which the common services are security services, a user of computer system 12a may open a web browser and be presented with a web page requesting the user's username and password, while a user of computer system 12b may open a browser and be presented with a web page requesting the user's username, password, and a special passkey. Any suitable protocol translations may be performed in the background and may not be visible to the user.

Upon receiving a result from other components of common services module 14 for communication to the requesting computer system 12 (or another suitable system), client façade 32 may convert the standardized output information to a format suitable for communication to and use with the particular computer system 12. For example, in providing a response (i.e., output) to computer system 12, common services module 14 may gather the normalized response information, and client façade 32 may handle the web-services specific logic to issue the response message (i.e., output) to the requesting computer system 12.

Application logic 34 manages the interoperation of the different components of common services module 14 to provide the common services to computer systems 12. Application logic 34 may retrieve the configuration information for the client associated with the computer system 12 that submitted a request and append this information to (or otherwise combine this information with) the request information as normalized by client façade 32. Application logic 34 may invoke configuration processing 36 to retrieve the appropriate configuration information for the client from configuration database 22.

Configuration processing 36 encapsulates the database operations for retrieving configuration information from configuration database 22 in response to a common services request. Configuration processing 36 is operable to access configuration database 22 (e.g., in response to a request from application logic 34) to retrieve configuration data 40 for a particular client. Configuration processing 36 receives the accessed configuration data 40 from configuration database 22 and provides the received configuration data to application logic 34. In certain embodiments, configuration processing 36 assembles the received configuration data 40 in a manner suitable for use by application logic 34.

Configuration database 22 stores configuration information 40 for the various client companies. In the illustrated example, configuration 40a corresponds to Company A and computer system 12a, and configuration 40b corresponds to Company B and computer system 12b. The configuration 40 for a particular client company may be specified and stored in configuration database 22 at a configuration and registration phase (i.e., at build time, prior to system 10 processing requests from the client). Each client may be assigned a unique ID. The configuration 40 that corresponds to a client may be indexed by and accessed using the unique ID for the client. For example, requests received from computer systems 12 may include the unique ID of the client associated with the computer system 12, which may be used to access the configuration 40 for that client. Configurations 40 may be stored in a secure manner that reduces or substantially eliminates the possibility that the configuration 40 for one client being accessed by another client.

Configuration 40 for a particular client may be used to configure the processing of the client request to provide the requested common service according to the specifications for the particular client. A configuration 40 for a particular client may specify one or more processes for performing a requested common service for the client. A particular advantage of certain embodiments of the present invention is the ability to allow common services to be provided according to client-specific configurations for each of a number of clients.

Configuration database 22 may take the form of volatile or non-volatile memory including, without limitation, magnetic media, optical media, random access memory (RAM), read-only memory (ROM), removable media, or any other suitable memory component. In a particular example, configuration database 22 comprises a relational database. Although configuration database 22 is described primarily as a database, the present invention contemplates system 10 storing configurations 40 in any suitable type of memory module, according to particular needs.

Upon receiving the configuration data 40 using configuration processing 36 and appending this configuration data to (or otherwise combine the configuration data with) other information from the request, application layer 34 may cause orchestration proxy 38 to invoke orchestration layer 24. Application logic 34 may assemble the information for orchestration layer 24 to perform its functions. For example, application logic 34 may assemble the parameters of the request and provides a data structure to orchestration layer 38, appending the received configuration 40 (e.g., a portion or the entire configuration 40 for the client). In the response process, application logic 34 may simply pass through the return information to client façade 32 for communication to the appropriate client.

In response to an invocation from application logic 34, orchestration proxy 38 is operable to invoke orchestration layer 24. Additionally, orchestration proxy 38 is operable to receive a result from orchestration layer 24 and forward the result to application logic 34. The orchestration proxy 38 may serve as an intermediary between the application logic 34 and orchestration layer 24, allowing application logic 34 to call orchestration layer 24 in a suitable format (e.g., using web services).

For example, if the orchestration proxy 38 conforms to web services standards, it could provide flexibility in the development environment. A client organization, could, for example, be skilled in JAVA technologies and can implement a common service in the orchestration layer 24 using JAVA. Another client organization who is familiar with .NET framework could implement the orchestration layer 24 in .NET. The service provider could send the information via web services to the orchestration layer 24 without concern about the programming language used to implement the orchestration layer 24.

Orchestration layer 24 may hard-code the mapping between the canonical interfaces implemented by client façade 32 to the processing for performing the common service according to the configuration 40 for the particular client company that submitted the request (i.e., to implement the functionality shown in the client façade, augmented by client configurations 40 and the appropriate vendor-specific solution 18). In other words, orchestration layer 24 supplies the logic for providing the common service to the client company according to the client company's configuration 40.

Orchestration layer 24 includes an orchestration engine 42 that is operable to generate and store one or more processes 44. In the illustrate example, process 44a corresponds to Company A and computer system 12a, and process 44b corresponds to Company B and computer system 12b. The process 44 for a particular client company may provide the actual steps to be performed, according to the configuration 40 for the particular client company, to provide the common service to the particular client company. These steps of the process 44 may be developed for the particular client company by the application developer, in cooperation with the client company. In certain embodiments, the process 44 is built at configuration time, prior to entering the run-time environment.

Orchestration layer 24 receives the normalized request and configuration information (determined from configuration 40) and invokes the specific orchestration process 44 that handles the interface for the configuration 40 for the particular client company. The orchestration logic may involve the invocation of one or more adapter interfaces in order to satisfy the specific interface operation for the client application. For example, a basic, business process execution layer (BPEL)-based business process per interface may be provided, which may invoke adapter layer 30.

Adapter layer 30 comprises one or more adapters 46. Each adapter 46 is operable to interact with a corresponding vendor-specific solution 18. Vendor-specific solutions 18 provide vendor-specific implementations of functions for providing a common service. The application developer may use these adapters 46 so that common services module 14 can operate with different vendor-specific solutions 18.

Adapters 46 allow orchestration layer 24 to interface with vendor-specific solutions 18. As just one example, a vendor-specific solution 18 may require communication in a particular protocol and/or message format, and an adapter 46 for the vendor-specific solution 18 may provide the ability for orchestration layer 24 to communicate with the vendor-specific solution 18 using that protocol and/or message format.

Orchestration layer 24 may call one or more appropriate adapters 46, which can handle the specific coding for the vendor-specific solution 18. Adapters 46 translate between the canonical form and the application program interfaces (APIs) for the vendor-specific solutions 18 for providing operations supported by the canonical interfaces. In certain embodiments, there is a one-to-one correspondence between adapter 44 and vendor-specific solution; however, this is optional.

Vendor-specific solutions 18 comprise offerings to perform specific functions that a client company may request. In an example in which the common services are security services, various vendor-specific solutions 18 may be available to provide security services. In a particular example, a particular client company (e.g., Company A or Company B) may wish to use one of those vendor-specific solutions 18 to provide security services for the company's computer system 12. In a security implementation, examples of vendor-specific solutions 18 include ACCESS MANAGER (formerly known as CLEAR TRUST) by RSA, a fingerprint reader, retinal scanner, SITE MINDER by CA, INC., IDENTITY MANAGER by ORACLE, or an anti-virus platform.

Each vendor-specific solution 18 may be located in any suitable location. For example, a vendor-specific solution 18 may be provided on a client system 12, a computer system associated with common services module 14, or any other computer system, according to particular needs. In certain embodiments, adapters 46 are located at the service provider, but may be usable with any instance of the vendor-specific solutions 18, which may enhance the reusability of common services module 14.

In certain embodiments, common services module 14 implements a security common services stack that is a reusable runtime asset for client applications of computer systems 12 to perform authentication, authorization, and identity management functions, such as provisioning and administration. Common services module 14 may support a multi-tenancy environment, where each client application has the ability to orchestrate its specific business processes with a number of vendor specific solutions 18 for identity management.

Each of computer systems 12, common services module 14, and vendor-specific solutions 18 may include any suitable combination of software, firmware, and hardware. Computer systems 12, common services module 14, and vendor-specific solutions 18 may each include one or more computer systems operating at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, one or more servers, a server pool, one or more processors within these or other devices, or any other suitable processing device.

Each computer system of system 10 may include one or more processing modules and one or more memory modules. A processing module may include one or more microprocessors, controllers, or any other suitable computing devices or resources. Processing modules may work, either alone or with other components of system 10, to provide the functionality of system 10 described herein. Each memory module may take the form of volatile or non-volatile memory including, without limitation, magnetic media, optical media, random access memory (RAM), read-only memory (ROM), removable media, or any other suitable memory component.

In operation of an example embodiment of system 10, it will be assumed that a build stage has been completed. During the build stage, one or more of a client and the provider of common services module 14 may establish configuration 40 for the client. Application developers may perform appropriate modifications to common services module 14 to prepare common services module 40 for processing requests from the client to provide the common services to the client. It should be noted that an advantage of certain embodiments of the present invention is that the canonical interfaces decrease or minimize the amount of work the application developers perform to allow the common services to be provided to the client. It will also be assumed that the appropriate one or more adapters 46 are in place and have access to the desired vendor-specific solution(s) 18 for providing the common services to the client.

A request to provide one or more common services may be received from a computer system 12 associated with a particular client (e.g., from computer system 12a associated with client 12a). The request may include one or more parameters, such as a unique ID of the client and any other suitable parameters. The request may be submitted according to a protocol and message format used by the computer system 12. The request may be submitted by the computer system 12 via network 16 using client façade 32 of common services module 14.

At least a portion of the request may be converted according to a canonical form. For example, client façade 32 of common services module 14 includes logic that is able to understand the received request may convert the request according to a canonical form. The request can be sent via web services or any other format that the requesting computer system 12 uses.

Configuration data 40 for the particular client from which the request was received may be accessed. Configuration data 40 for the particular client may specify one or more processes 44 for providing at least a portion of common functions to the particular client. In certain embodiments, client façade 32 may invoke application logic 34 to process a request that has been converted to the canonical form. Application logic 34, after receiving the request in the canonical form, may prompt configuration processing 36 to retrieve configuration data 40 for the particular client associated with the request. Application logic 34 and/or configuration processing 36 may determine from the request the unique ID of the client that submitted the request and access appropriate configuration data 40 from configuration database 22 using the unique ID of the particular client.

Based on the accessed configuration data 40 for the particular client, the one or more processes 44 are executed to communicate with a vendor-specific solution 18 for providing the requested common services. In certain embodiments, upon receiving the configuration data 40 using configuration processing 36 and appending this configuration data to (or otherwise combine the configuration data with) other information from the request, application layer 34 may cause orchestration proxy 38 to invoke orchestration layer 24. Application logic 34 may assemble the information for orchestration layer 24 to perform its functions. For example, application logic 34 may assemble the parameters of the request and provides a data structure to orchestration layer 38, appending the received configuration 40 (e.g., a portion or the entire configuration 40 for the client).

In response to an invocation from application logic 34, orchestration proxy 38 is operable to invoke orchestration layer 24. Additionally, orchestration proxy 38 is operable to receive a result from orchestration layer 24 and forward the result to application logic 34. The orchestration proxy 38 may serve as an intermediary between the application logic 34 and orchestration layer 24, allowing application logic 34 to call orchestration layer 24 in a suitable format (e.g., using web services).

Orchestration layer 24 may invoke the one or more processes 44 specified by configuration 40 for the particular client. The process 44 for a particular client company may provide the actual steps to be performed, according to the configuration 40 for the particular client company, to provide the common service to the particular client company. Orchestration layer 24 receives the normalized request and configuration information (determined from configuration 40) and invokes the specific orchestration process 44 that handles the interface for the configuration 40 for the particular client.

The invoked process 44 may call an appropriate adapter 46 of adapter layer 30 in order to interface with an appropriate vendor-specific solution 18 for processing the client's request. As described above, adapters 46 allow orchestration layer 24 to interface with vendor-specific solutions 18. As just one example, a vendor-specific solution 18 may require communication in a particular protocol and/or message format, and an adapter 46 for the vendor-specific solution 18 may provide the ability for orchestration layer 24 to communicate with the vendor-specific solution 18 using that protocol and/or message format.

The appropriate vendor-specific solution 18 may perform appropriate processing to provide at least a portion of the common service to the particular client. In an example in which the common services are security services, various vendor-specific solutions 18 may be available to provide security services. In a particular example, a particular client company (e.g., Company A or Company B) may wish to use one of those vendor-specific solutions 18 to provide security services for the company's computer system 12.

Adapter layer 30 or another suitable component of system 10 may receive a response from vendor-specific solution 18. At least a portion of the response from vendor-specific solution 18 may be converted into the canonical form. For example, the response adapter layer 30 receives from vendor-specific solution 18 may be in a format associated with vendor-specific solution 18 rather than in the canonical form. Adapter layer 30 may convert at least a portion of the response into the canonical form for processing by common service module 14.

Common services module 14 may determines an output for providing at least a portion of the common functions. The output may be determined based on configuration data 40 for the particular client and the response from the vendor-specific solution 14. In a security implementation, for example, the output may include whether the user is authorized to access the system, what type of access is permitted by the user, whether system logging is started, or any other operation the client company has requested from the service provider. In certain embodiments, the output may be converted from the canonical form into a format suitable for transmission to the requesting computer system 12. For example, the format to which the output is converted may be the same as the format in which the request for the common service was received from the computer system 12. The output may be transmitted to the computer system 12 of the particular client. In certain embodiments, the output will be sent to computer system 12 via network 16, but any suitable form of transmission is contemplated.

Particular embodiments of the present invention may provide one or more technical advantages. In certain embodiments, the present invention provides a reusable and configurable multi-tenant run-time environment for client applications to perform one or more common functions. For example, a single instance of the common services module 14 may be able to support multiple client companies while maintaining the integrity and confidentiality of the data for each client. In certain embodiments, the present invention provides an extensible and configurable system. For example, the present invention may be configurable according to client-specific configurations 40 and extensible to handle different and/or new vendor-specific solutions 18.

In certain embodiments, the present invention provides a consistent interface for application developers to use to provide the common service, regardless of the vendor-specific solution 18 actually used to implement the service, which may speed up the application development process. This may decrease the time for application developers to develop applications for clients and may lead to faster time-to-market and/or faster time-to-revenue. In certain embodiments, the present invention may enhance a service provider's Service Oriented Architecture (SOA) capabilities. In certain embodiments, the present invention is adapted to more easily handle application changes (e.g., changes to a vendor-specific solution 18 or platform) for clients than previous solutions, which typically required application developers to modify application source code to conform to the changes. This may reduce or eliminate the cost of incorporating client changes.

Certain embodiments of the present invention may provide common security services (e.g., as a security common services stack). Such embodiments may provide better control of the development and change process of Identity and Access Management logic improves the overall application security posture. In certain embodiments, application developers are relieved of the burden of developing logic specific to Identity and Access Management. As the security common services stack was architected as loosely coupled components connected through open standards (e.g., web services), there is flexibility on deployment to address scalability needs. Certain embodiments reduce security vulnerabilities, which may reduce maintenance costs and increase a provider's reputation on protecting a client's information assets. In a security context with previous and existing solutions, modifications to application source code in response to a vendor or platform change often cause unforeseen vulnerabilities to appear in the system. Certain embodiments of the present invention reduce or eliminate such unforeseen vulnerabilities.

In certain embodiments, when a client leverages common services module 14, behavior for each of the canonical interfaces may be configured and verified by an administrator. For example, when a client leverages the security common services stack, behavior for each canonical interface may be configured and verified by a security administrator. An application development team may be assembled to develop reusable orchestration processes 44 and leverage existing adapters 18 in order to enhance the behavior of the canonical interfaces to meet common organization or enterprise-wide requirements associated with the common services provided. For example, an application development team may be assembled to develop reusable orchestration processes 44 and leverage existing adapters 18 in order to enhance the behavior of the canonical interfaces to meet common organizational or enterprise-wide security requirements (e.g., regulatory compliance and/or security policies).

In certain embodiments, during an application development process, developers can be concerned with the innerworking details of the common services provided (e.g., authentication, authorization, administration, and provisioning services). Instead, the developers may invoke the relevant canonical interfaces from an already-configured common services module 18 (e.g., security common services stack) and take appropriate action on the returned information.

Figure 2:
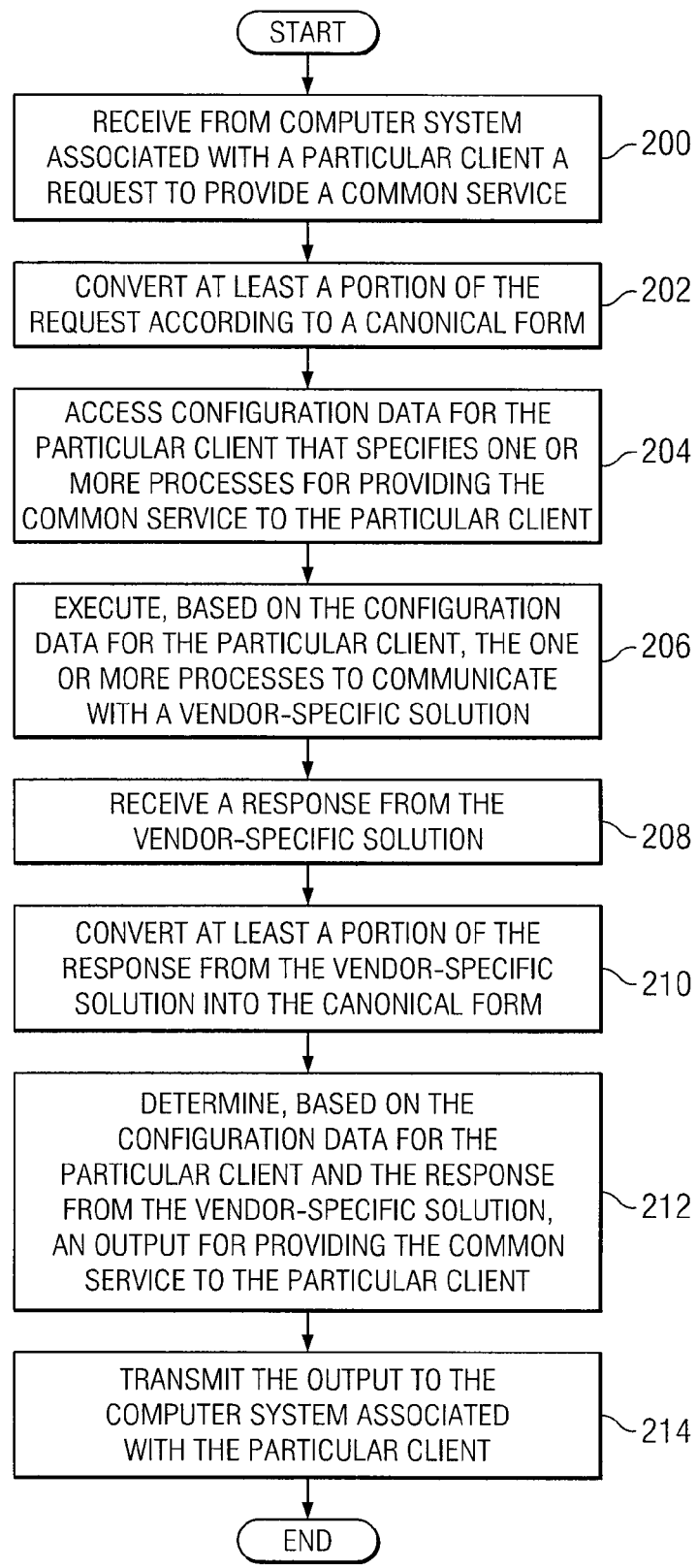
FIG. 2 illustrates an example method for processing client requests for common services according to one or more canonical forms.

FIG. 2 illustrates an example method for processing client requests for common services according to one or more canonical forms. The method may be implemented in any suitable combination of software, firmware, and hardware, according to particular needs. Although particular components may be identified as performing particular steps, the present invention contemplates any suitable components performing the steps according to particular needs.

As described above with respect to the example operation of system 10, it will be assumed for purposes of describing this example method that a build stage has been completed. During the build stage, one or more of a client and the provider of common services module 14 may establish configuration 40 for the client. Application developers may perform appropriate modifications to common services module 14 to prepare common services module 40 for processing requests from the client to provide the common services to the client. It will also be assumed that the appropriate one or more adapters 46 are in place and have access to the desired vendor-specific solution(s) 18 for providing the common services to the client.

At step 200, a request to provide one or more common services is received from a computer system 12 associated with a particular client (e.g., from computer system 12a associated with client 12a). For example, the request may be to provide security authentication or system logging, but can be for any common service for which a client company has contracted with a service provider to provide. The request may include one or more parameters, such as a unique ID of the client and any other suitable parameters. The request may be submitted according to a protocol and message format used by the computer system 12. The request may be submitted by the computer system 12 using client façade 32 of common services module 14.

In a security example, a user at client company A may seek to authenticate himself on the company's network by providing a username and a password, as well as a secondary token of identification such as an ACCESS MANAGER key. That request is transmitted via network 16 to common services module 14. The information transmitted may include the username, password, secondary token, and client ID. Computer system 12 might transmit the request in web services format.

At step 202, at least a portion of the request may be converted according to a canonical form. For example, client façade 32 of common services module 14 includes logic that is able to understand the received request may convert the request according to a canonical form. The request can be sent via web services or any other format that the requesting computer system 12 uses. In certain embodiments, if a client application does not provide a valid unique ID (i.e., for retrieving configuration 40 for the client), an error code may be returned. If the client application provides an empty unique ID (e.g., null), a default configuration may be executed. Additionally or alternatively, an error may be returned if the client ID is null.

A client's needs may change. For example, the client may wish to use fingerprint scans instead of the ACCESS MANAGER key. In such an event, only client façade 32 may need to be reprogrammed in order to properly convert fingerprint data into the canonical form. In this example, fingerprint scans may be converted to a token or a hash value within the client's environment. This additional hash value or token will be passed to the façade. The façade is capable of receiving multiple tokens and supporting multiple steps for authentication.

At step 204, configuration data 40 for the particular client from which the request was received may be accessed. Configuration data 40 for the particular client may specify one or more processes 44 for providing at least a portion of common functions to the particular client. In a security example, configuration information 40 may inform application logic 34 that for this particular client, the username, password, and ACCESS MANAGER key and/or any other suitable token should be processed in order to authenticate the user on the company's network.

In certain embodiments, client façade 32 may invoke application logic 34 to process a request that has been converted to the canonical form. Application logic 34, after receiving the request in the canonical form, may prompt configuration processing 36 to retrieve configuration data 40 for the particular client associated with the request. Application logic 34 and/or configuration processing 36 may determine from the request the unique ID of the client that submitted the request and access appropriate configuration data 40 from configuration database 22 using the unique ID of the particular client.

At step 206, based on the accessed configuration data 40 for the particular client, the one or more processes 44 are executed to communicate with a vendor-specific solution 18 for providing the requested common services. In an example security implementation that uses an ACCESS MANAGER key, a process 44 may involve using the request parameters sent by the computer system 12, the configuration data 40 for the particular client retrieved from configuration database 22, and a call to a vendor-specific solution 18 to process the ACCESS MANAGER key information.

In certain embodiments, upon receiving the configuration data 40 using configuration processing 36 and appending this configuration data to (or otherwise combine the configuration data with) other information from the request, application layer 34 may cause orchestration proxy 38 to invoke orchestration layer 24. Application logic 34 may assemble the information for orchestration layer 24 to perform its functions. For example, application logic 34 may assemble the parameters of the request and provides a data structure to orchestration layer 38, appending the received configuration 40 (e.g., a portion or the entire configuration 40 for the client).

In response to an invocation from application logic 34, orchestration proxy 38 is operable to invoke orchestration layer 24. Additionally, orchestration proxy 38 is operable to receive a result from orchestration layer 24 and forward the result to application logic 34. The orchestration proxy 38 may serve as an intermediary between the application logic 34 and orchestration layer 24, allowing application logic 34 to call orchestration layer 24 in a suitable format (e.g., using web services).

For example, if the orchestration proxy 38 conforms to web services standards, it could provide flexibility in the development environment. A client organization, could, for example, be skilled in JAVA technologies and can implement a common service in the orchestration layer 24 using JAVA. Another client organization who is familiar with .NET framework could implement the orchestration layer 24 in .NET. The service provider could send the information via web services to the orchestration layer 24 without concern about the programming language used to implement the orchestration layer 24.

Orchestration layer 24 may invoke the one or more processes 44 specified by configuration 40 for the particular client. For example, process 44a may correspond to Company A and computer system 12a, and process 44b corresponds to Company B and computer system 12b. The process 44 for a particular client company may provide the actual steps to be performed, according to the configuration 40 for the particular client company, to provide the common service to the particular client company. For example, process 44a may be invoked to process the ACCESS MANAGER key data, process 44b may be invoked to process fingerprint data. As a particular example, process 44a may process the ACCESS MANAGER key data to log an event to meet regulatory compliance requirements. As another particular example, process 44b may apply transformations to the request data. Any suitable number of vendor-specific solutions 18 may be used, according to the configuration data 40 for the particular client.

Orchestration layer 24 receives the normalized request and configuration information (determined from configuration 40) and invokes the specific orchestration process 44 that handles the interface for the configuration 40 for the particular client. The invoked process 44 may call an appropriate adapter 46 of adapter layer 30 in order to interface with an appropriate vendor-specific solution 18 for processing the client's request. As described above, adapters 46 allow orchestration layer 24 to interface with vendor-specific solutions 18. As just one example, a vendor-specific solution 18 may require communication in a particular protocol and/or message format, and an adapter 46 for the vendor-specific solution 18 may provide the ability for orchestration layer 24 to communicate with the vendor-specific solution 18 using that protocol and/or message format.

Adapters 46 may convert the information that is in the canonical form to a suitable format for the APIs for the vendor-specific solutions 18 for providing operations supported by the canonical interfaces. For example, adapter 46a may convert the username and ACCESS MANAGER key data into a format that the RSA vendor-specific solution 18a that is used to verify ACCESS MANAGER key data can understand. As another example, adapter 46b may be used to communicate to vendor-specific solution 18b information for processing the client's request. A single adapter 46 may be used for multiple clients who use ACCESS MANAGER key as a vendor-specific solution 18. An advantage of this embodiment is that additional adapters 46 may be added as additional vendor-specific solutions 18 are used by clients without the need for redesigning the system.

The appropriate vendor-specific solution 18 may perform appropriate processing to provide at least a portion of the common service to the particular client. In an example in which the common services are security services, various vendor-specific solutions 18 may be available to provide security services. In a particular example, a particular client company (e.g., Company A or Company B) may wish to use one of those vendor-specific solutions 18 to provide security services for the company's computer system 12. In a security implementation, examples of vendor-specific solutions 18 include an ACCESS MANAGER key, a fingerprint reader, retinal scanner, or an anti-virus platform. In a user authentication example, the vendor-specific solution 18 may perform the actual authentication of the user according to the one or more parameters of the request.

At step 208, adapter layer 30 or another suitable component of system 10 receives a response from vendor-specific solution 18. In a security implementation, for example, the response may include information indicating whether the user is authenticated and/or authorized to use the system.

At step 210, at least a portion of the response from vendor-specific solution 18 is converted into the canonical form. For example, the response adapter layer 30 receives from vendor-specific solution 18 may be in a format associated with vendor-specific solution 18 rather than in the canonical form. Adapter layer 30 may convert at least a portion of the response into the canonical form for processing by common service module 14.

At step 212, common services module 14 determines an output for providing at least a portion of the common functions. The output may be determined based on configuration data 40 for the particular client and the response from the vendor-specific solution 14. In a security implementation, for example, the output may include whether the user is authorized to access the system, what type of access is permitted by the user, whether system logging is started, or any other operation the client company has requested from the service provider. In certain embodiments, the output may be converted from the canonical form into a format suitable for transmission to the requesting computer system 12. For example, the format to which the output is converted may be the same as the format in which the request for the common service was received from the computer system 12.

At step 214, the output is transmitted to the computer system 12 of the particular client. In certain embodiments the output will be sent to computer system 12 via network 16, but any suitable form of transmission is contemplated.

Although a particular method for processing client requests for common services according to one or more canonical forms has been described with reference to FIG. 2, the present invention contemplates any suitable method in accordance with the present invention. Thus, certain of the steps described with reference to FIG. 2 may take place substantially simultaneously and/or in different orders than as shown and described. Moreover, components of system 10 may use methods with additional steps, fewer steps, and/or different steps, so long as the methods remain appropriate. Furthermore, although particular components of system 10 are described as performing particular steps of the method described with reference to FIG. 2, the present invention contemplates any suitable components of system 10 and/or components of other embodiments of the present invention performing the steps.

FIG. 3 illustrates a table 300 of example common services 302 in a security services implementation, along with example canonical interfaces 302 that may correspond to those example common services 302. Each of these services 302 supports one or more canonical interfaces 304 that are made available to application developers. Prior to the runtime use of system 10, behavior for canonical interfaces 304 can be individually configured in order to meet organizational services (e.g., security) requirements. In certain embodiments, one deployment instance of common services module 14 is capable of supporting multiple client applications.

In certain embodiments of a security implementation in which common service 302 implements a security common services stack, common services 302 used by client companies may include an authentication service, an administration service, an authorization service, and a provisioning service. The determination of the particular subdivisions of services and their corresponding canonical interfaces may be made in any suitable manner, according to particular needs. In one example, the security common services stack may provide a reusable and configurable multi-tenant runt-time environment for client applications to perform authentication, authorization, administration, provisioning, and any other suitable services.

The authentication service involves verifying the identity of a user. For example, the authentication service may provide for verifying the identity of users of computer systems 12. Canonical interfaces 304 for the authentication service may include Authenticate and Logoff. Authenticate may verify that the user is allowed to access the system (e.g., computer system 12). Logoff may notify a system (e.g., computer system 12) that an authorized user is no longer accessing the system.

The administration service is an identity management function for modifying user information. For example, the authentication service may provide for the management of user attributes within a system (e.g., computer system 12). Canonical interfaces 304 for the administration service may include GetUser, ChangeUser, ChangePassword, ResetPassword, GetAvailableRoles, AddRoles, and RemoveRoles. The canonical interface GetUser may allow an administrator to bring up the record of a particular user of the system (e.g., computer system 12). The canonical interface ChangeUser may allow editing of a user's name, address, work title, or other identifying attributes. The canonical interface ChangePassword may allow a user or administrator to change a password. The canonical interface ResetPassword may allow an administrator to reset a user's password in the event that a user has forgotten his or her password. The canonical interface GetAvailableRoles may allow an administrator to view what roles are available to be assigned to a user. The canonical interfaces AddRoles and RemoveRoles may allow an administrator to add or remove roles from users.

The authorization service involves defining what a user who has been authenticated has the right to do. For example, the authorization service may provide an administrator the ability to allow or deny access to users for specific functions, either by authorizing users individually or by specific access groups (e.g., roles). Canonical interfaces 304 for the authorization service may include GetClientList, GetRoles, and IsAuthorized. The canonical interface GetClientList may enable an administrator to view the list of clients that are available on the system (e.g., computer system 12). The canonical interface GetRoles may allow an administrator to view the various access groups and their permissions. The canonical interface IsAuthorized may allow an administrator to authorize specific permissions to users or groups.

The provisioning service may provide an administrator the ability to add or delete users and other tasks related to the whole of the user's account. Canonical interfaces 304 for the provisioning service may include CreateUser, GetAvailableUserAttributes, and SuspendUser. The canonical interface CreateUser may allow an administrator to add users to the system (e.g., computer system 12). The canonical interface GetAvailableUserAttributes may allow an administrator to obtain attributes that he or she may assign to a user. The canonical interface SuspendUser may allow an administrator to prevent a user from accessing the system (e.g., computer system 12) without actually deleting the user.

The particular common services 302 and canonical interfaces 304 described above have been provided for example purposes only. The present invention contemplates system 10 including different and/or additional common services 302 and canonical interfaces 304, according to particular needs.

Figure 4:
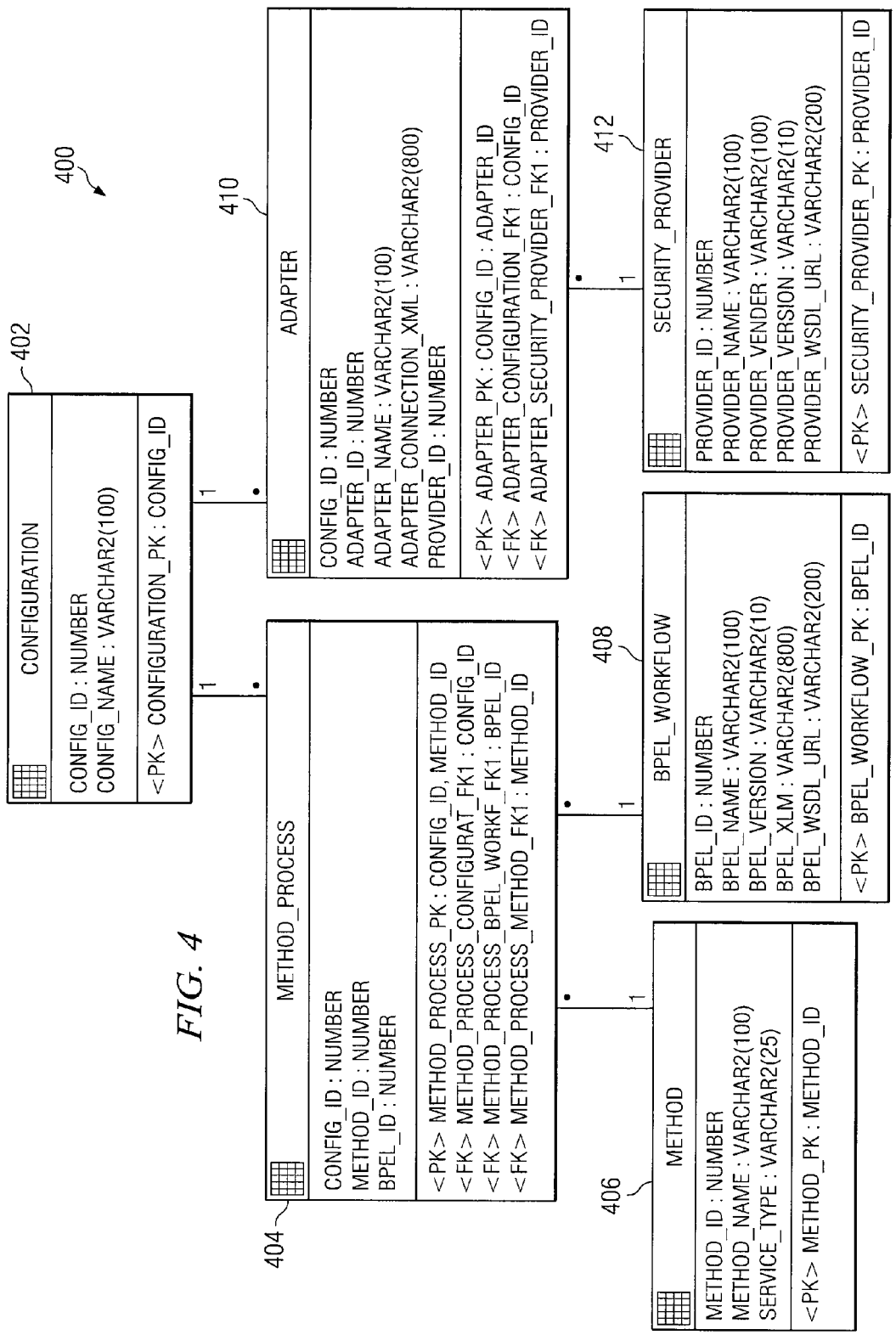
FIG. 4 illustrates example data structures may be used in certain embodiments of the present invention.

FIG. 4 illustrates example data structures 400 may be used in certain embodiments of the present invention. For example, data structures 400 may provide the database schema of configuration database 22, which may be used by common services module 14 to support multi-tenancy. Data structures 400 may include database tables, for example.

In certain embodiments, configuration database 22 includes three main parts, which are provided for example purposes only. Those three parts are configuration information, process flow definitions (e.g., BPEL workflow definitions), and vendor-specific solution definitions.

Configuration information—In certain embodiments, the configuration information is optionally stored as one entry (i.e., one configuration) per configuration ID. Each configuration may include:

1) Configuration ID. In certain embodiments, if a client application does not provide a valid configuration ID to common services module 14, an error may be returned.

2) Configuration name.

3) List of canonical interfaces (e.g., authenticate, logoff, GetUser, etc.) offered by common services module 14. Each canonical interface may include a name, a service type (e.g., authenticate, administration, authorization, provisioning, etc.), and a process flow (e.g., BPEL workflow) ID. This ID may be used to determine which workflow to execute in order to fulfill the request.

4) List of adapters 46 for the configuration. Each adapter 46 includes a vendor-provider ID that references the particular vendor definition, described below, and connection information. The connection information may be an XML (or other format) document describing the details for connecting to the specific instance of the vendor-specific solution 18 (e.g., server IP address, etc.). The contents of the XML document may vary depending on the vendor-specific solution 18 used. Workflows may be responsible for calling the appropriate vendor-specific APIs, so those workflows may use the connection information to connect to appropriate vendor-specific solutions 18.

Process flow (e.g., BPEL workflow) definitions—In certain embodiments, the process flow definitions store the process/workflows defined in the system. The workflow definitions may be optionally stored as one entry (i.e., one definition) per workflow. Each entry may include:

1) Process flow ID—a unique ID per flow;
2) Process flow Name;
3) Process flow Version;
4) BPEL definition; and
5) WSDL for the process flow.

Vendor-specific solution definitions—In certain embodiments, the vendor-specific solution definitions are optionally stored as one entry (i.e., one definition) per vendor-specific solution 18. Each entry may include:

1) Vendor-specific solution ID—a unique ID per vendor-specific solution;
2) Vendor Name;
3) Vendor Specific Product Version; and
4) WSDL encapsulating the vendor-specific solution API.

A particular example structure for data structure 400 is described below:

In the illustrated example, data structures 400 include a CONFIGURATION structure 402, a METHOD_PROCESS structure 404, an ADAPTER structure 410, a METHOD structure 406, a BPEL_WORKFLOW structure 408, and a SECURITY_PROVIDER structure 412.

CONFIGURATION structure 402 includes a CONFIG_ID number that corresponds to the client ID for each individual client company. CONFIG_NAME may represent the name of the client company.

METHOD_PROCESS structure 404 may include the identification of methods and processes to be run by a particular client company. CONFIG_ID may include the corresponding CONFIG_ID number from CONFIGURATION structure 402. METHOD_ID may include an identification of the method. BPEL_ID may include the BPEL workflow processes to be run by a particular client company.

METHOD structure 406 may include information about each particular method. The METHOD_ID may include the corresponding METHOD_ID in METHOD_PROCESS structure 404. METHOD_NAME may include the name of the particular method. SERVICE_TYPE may include a description of the service that the particular method provides.

BPEL_WORKFLOW structure 408 may include information about each particular BPEL workflow. BPEL_ID may include the corresponding BPEL_ID in METHOD_PROCESS structure 404. BPEL_NAME may include the name of the BPEL workflow process. BPEL_VERSION may include the version of a particular process. BPEL_XML may include XML coding for the BPEL workflow process. BPEL_WSDL_URL may include a URL for calling a WSDL process.

ADAPTER structure 410 may include information regarding adapters 46. CONFIG_ID may include the corresponding CONFIG_ID number from CONFIGURATION structure 402. ADAPTER_ID may include an identification of the adapter 46. ADAPTER_NAME may include the name of the particular adapter 46. ADAPTER_CONNECTION_XML may include XML coding for the adapter process. PROVIDER_ID may include an identification of the vendor-specific solution 18 that corresponds to the adapter 46.

SECURITY_PROVIDER structure 412 may include information relating to a particular vendor-specific solution 18. PROVIDER_ID may include the corresponding PROVIDER_ ID number from ADAPTER structure 410. PROVIDER_ NAME may include the name of the particular provider (i.e., the specific vendor) of the particular vendor-specific solution 18. PROVIDER_VENDOR may include information about the specific vendor. PROVIDER_VERSION may include the version number of the particular vendor-specific solution 18. PROVIDER_WSDL_URL may include the URL for calling the Provider WSDL process.

Figure 5A:
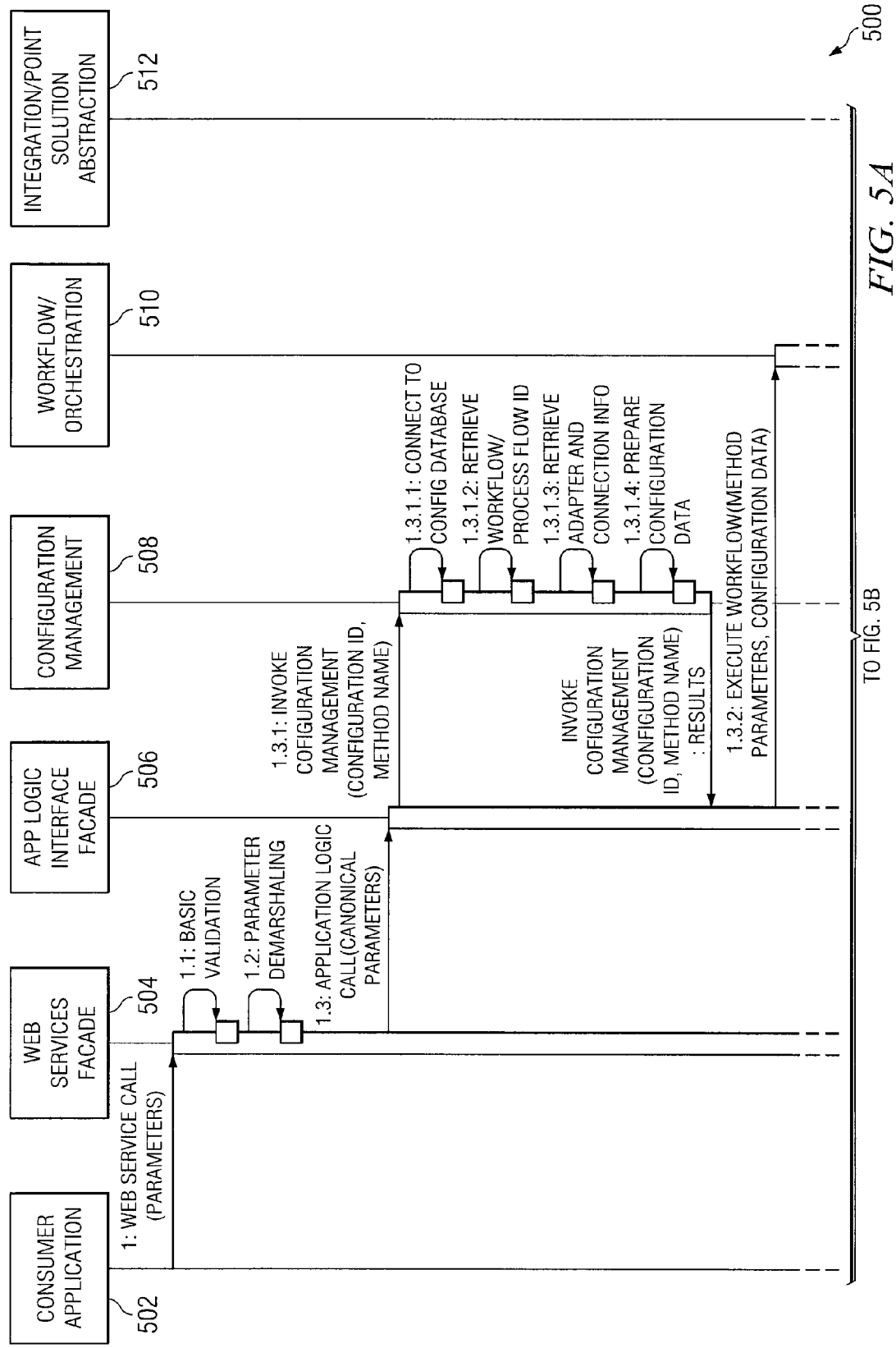
FIGS. 5A and 5B illustrate an example sequential workflow diagram representation of security common services, according to certain embodiments of the present invention.
Figure 5B:
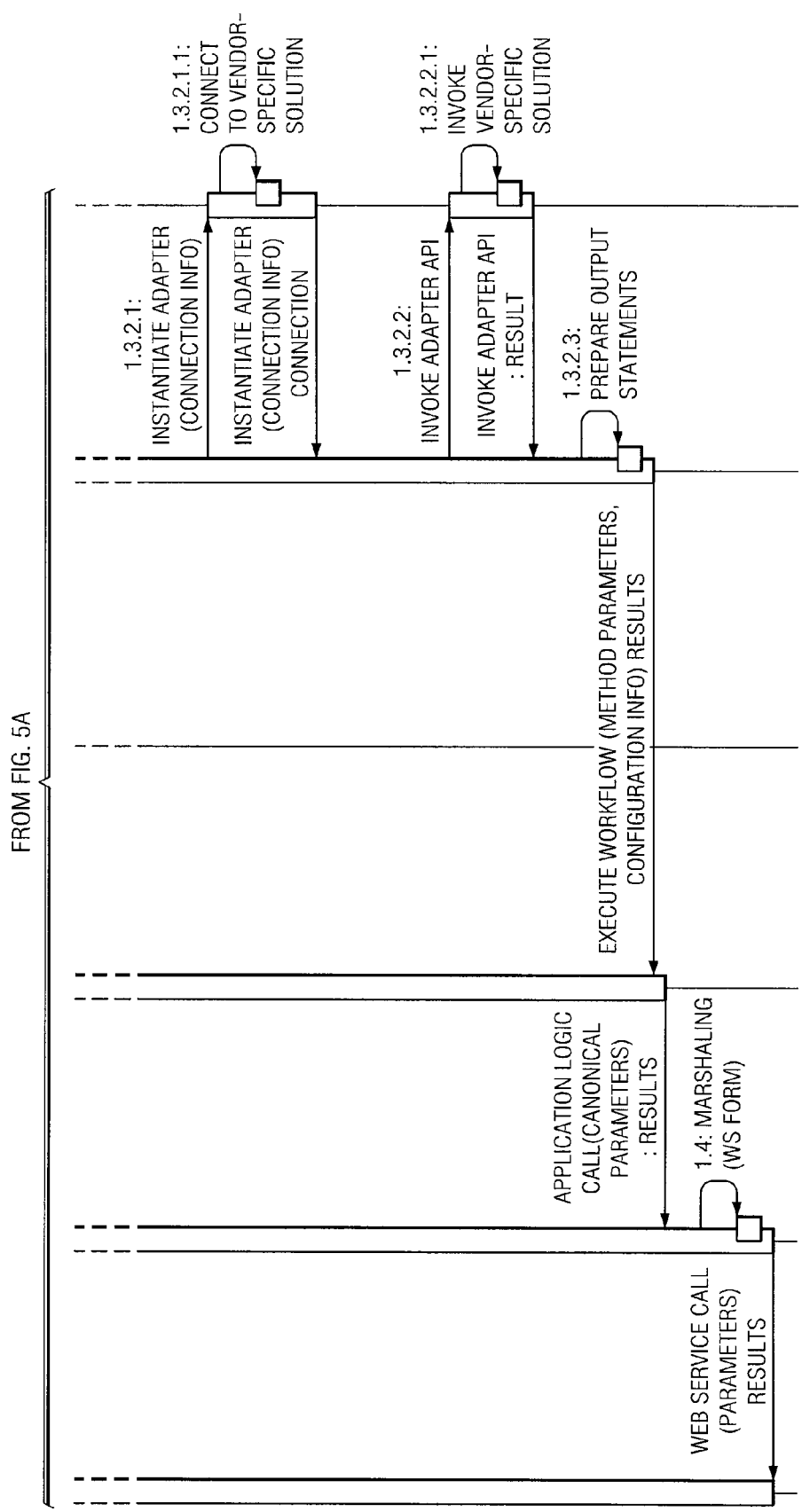

FIGS. 5A and 5B illustrate an example sequential workflow representation 500 of security common services, according to certain embodiment of the present invention. An example of the logical layers of the workflow is shown across the top of workflow representation 500. These example logical layers include consumer application 502 (e.g., of a computer system 12 of FIG. 1), web services façade 504 (e.g., which may correspond to client façade 32 of FIG. 1), application logic interface façade 506 (e.g., which may correspond to application logic 34 of FIG. 1), configuration management façade 508 (e.g., which may correspond to configuration processing 36 of FIG. 1), workflow/orchestration 510 (e.g., which may correspond to orchestration layer 24 of FIG. 1), and integration/point solution abstraction 512 (e.g., which may correspond to one or more of adapter layer 30 and vendor-specific solution 18 of FIG. 1).

Consumer application layer 502 includes a user of a consumer application (e.g., of a computer system 12) submitting a web service call that includes one or more parameters at step 1. The web service call may be a request for security common services. A consumer application of a computer system 12 may communicate the parameters of the security common services request through the web service call.

The request may be received at the web services façade layer 504. The web services façade layer may include performing basic validation of the request at step 1.1, such as verifying that the request came from a computer system 12. At step 1.2, a parameter de-marshaling operation may be performed in which the parameters of the request are processed from the web services call and converted into a canonical form. At step 1.3, the parameters in canonical form may then be sent via an application logic call to application logic interface façade layer 506.

At application logic façade layer 506, configuration management may be invoked at step 1.3.1, using the configuration ID and method name for example. This invocation calls the configuration management layer 508.

At configuration management layer 508, a connection to configuration database 22 may be established at step 1.3.1.1, the workflow and process flow IDs for the client may be retrieved at step 1.3.1.2, the adapter and connection information may be retrieved at step 1.3.1.3, and the configuration data may be prepared in the canonical form for transfer back to the application logic interface façade 522 at step 1.3.1.4. At application logic interface façade 522, configuration management may again be invoked, using the configuration ID and method name for example.

The method parameters and the configuration data are sent from application logic interface façade layer 506 to workflow/orchestration layer 510 via configuration management layer 508 at step 1.3.2. At workflow/orchestration layer 510, the received data may be processed and an adapter specified by the configuration data may be instantiated at step 1.3.2.1. The instantiated adapter initiates a connection to the vendor-specific solution at step 1.3.2.1.1. The adapter reports the connection to workflow/orchestration layer 510.

At workflow/orchestration layer 510, the adapter API is invoked at step 1.3.2.2 to convert from the canonical form to a form that the vendor-specific solution understands and cause an invocation of the vendor-specific solution via the opened connection at step 1.3.2.2.1. The results from vendor-specific solution are returned to the adapter API where they are converted into the canonical form for workflow/orchestration layer 510 to perform further processing.

At step 1.3.2.3, output statements in canonical form are then prepared based on the vendor-specific solution results and method parameters in the configuration data. The prepared output statements are transferred to application logic interface façade layer 506, which are in turn transferred to the web services façade layer 504.

Web services façade layer 504 marshals the information and converts it from canonical form to web services format at step 1.4. Web services façade layer 504 communicates the results in web services format to computer system 12 at consumer application layer 502 for display to the user.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for processing client requests for common services according to one or more canonical forms, comprising:
one or more memory modules configured to store configuration data for one or more clients; and
one or more processing units configured to:
receive from a computer system associated with a particular client a request to provide a common service;
convert at least a portion of the request according to a canonical form;
access, from the one or more memory modules, configuration data for the particular client, the configuration data for the particular client specifying one or more processes for providing the common service to the particular client;

execute, based on the configuration data for the particular client, the one or more processes to communicate with a vendor-specific solution for providing the common service;

convert at least a portion of a response from the vendor-specific solution into the canonical form;

determine, based on the configuration data for the particular client and the response from the vendor-specific solution, an output for providing the common service to the particular client; and transmit the output to the computer system associated with the particular client.

2. The system of claim 1, wherein the common service relates to security and comprises one or more of:
authentication;
administration;
authorization; and
provisioning.

3. The system of claim 1, wherein the request received from the computer system associated with a particular client is in a web services format.

4. The system of claim 1, wherein:
the one or more memory modules are configured to store configuration data for each of a plurality of clients, the configuration data for a client being indexed by a unique identifier for the client;
the request received from the particular client comprises the unique identifier for the particular client; and
the one or more processing units are configured to access the configuration data for the particular client using the unique identifier for the particular client.

5. The system of claim 1, wherein the one or more processing units are configured to invoke an adapter for communicating with the vendor-specific solution.

6. The system of claim 1, wherein the one or more processing units are configured to convert, according to the configuration data for the particular client, the response in canonical form into a format for communication to the particular client, the output comprising the converted response.

7. The system of claim 1, wherein the one or more processing units are located remotely from the computer system associated with the particular client.

8. A method for processing client requests for common services according to one or more canonical forms, comprising:
receiving from a computer system associated with a particular client a request to provide a common service;
converting at least a portion of the request according to a canonical form;
accessing configuration data for the particular client, the configuration data for the particular client specifying one or more processes for providing the common service to the particular client;
executing, based on the configuration data for the particular client, the one or more processes to communicate with a vendor-specific solution for providing the common service;
converting at least a portion of a response from the vendor-specific solution into the canonical form;
determining, based on the configuration data for the particular client and the response from the vendor-specific solution, an output for providing the common service to the particular client; and
transmitting the output to the computer system associated with the particular client.

9. The method of claim 8, wherein the common service relates to security and comprises one or more of:
authentication;
administration;
authorization; and
provisioning.

10. The method of claim 8, wherein the request received from the computer system associated with a particular client is in a web services format.

11. The method of claim 8, comprising:
storing configuration data for each of a plurality of clients, the configuration data for a client being indexed by a unique identifier for the client, the request received from the particular client comprises the unique identifier for the particular client; and
accessing the configuration data for the particular client using the unique identifier for the particular client.

12. The method of claim 8, comprising invoking an adapter for communicating with the vendor-specific solution.

13. The method of claim 8, comprising converting, according to the configuration data for the particular client, the response in canonical form into a format for communication to the particular client, the output comprising the converted response.

14. The method of claim 8, wherein the method is performed remotely from the computer system associated with the particular client.

15. Software for processing client requests for common services according to one or more canonical forms, the software being embodied in a computer-readable medium and when executed configured to perform operations comprising:
receiving from a computer system associated with a particular client a request to provide a common service;
converting at least a portion of the request according to a canonical form;
accessing configuration data for the particular client, the configuration data for the particular client specifying one or more processes for providing the common service to the particular client;
executing, based on the configuration data for the particular client, the one or more processes to communicate with a vendor-specific solution for providing the common service;
converting at least a portion of a response from the vendor-specific solution into the canonical form;
determining, based on the configuration data for the particular client and the response from the vendor-specific solution, an output for providing the common service to the particular client; and
transmitting the output to the computer system associated with the particular client.

16. The software of claim 15, wherein the common service relates to security and comprises one or more of:
authentication;
administration;
authorization; and
provisioning.

17. The software of claim 15, wherein the request received from the computer system associated with a particular client is in a web services format.

18. The software of claim 15, wherein the operations comprise:
storing configuration data for each of a plurality of clients, the configuration data for a client being indexed by a unique identifier for the client, the request received from the particular client comprises the unique identifier for the particular client; and
accessing the configuration data for the particular client using the unique identifier for the particular client.

19. The software of claim 15, wherein the operations comprise invoking an adapter for communicating with the vendor-specific solution.

20. The software of claim 15, wherein the operations comprise converting, according to the configuration data for the particular client, the response in canonical form into a format for communication to the particular client, the output comprising the converted response.

* * * * *